US010187352B2

(12) United States Patent
Sarawat et al.

(10) Patent No.: US 10,187,352 B2
(45) Date of Patent: *Jan. 22, 2019

(54) DETERMINISTIC MAPPING

(71) Applicant: Cable Television Laboratories, Inc., Louisville, CO (US)

(72) Inventors: Vikas Sarawat, Broomfield, CO (US); Karthik Sundaresan, Boulder, CO (US); Christopher Grundemann, Castle Rock, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,871

(22) Filed: Apr. 4, 2016

(65) Prior Publication Data

US 2016/0226820 A1    Aug. 4, 2016

Related U.S. Application Data

(63) Continuation of application No. 13/232,509, filed on Sep. 14, 2011, now Pat. No. 9,306,903.

(51) Int. Cl.
*G06F 15/16*    (2006.01)
*H04L 29/12*    (2006.01)
*H04L 29/06*    (2006.01)

(52) U.S. Cl.
CPC ...... *H04L 61/2514* (2013.01); *H04L 61/2517* (2013.01); *H04L 63/30* (2013.01); *H04L 61/2007* (2013.01)

(58) Field of Classification Search
CPC . H04L 61/2517; H04L 67/22; H04L 61/2514; H04L 63/068; H04L 61/2007; H04L 63/30
USPC .......................................... 709/238
See application file for complete search history.

(56) References Cited

U.S. PATENT DOCUMENTS

| 6,434,627 | B1 | 8/2002 | Millet et al. | |
|---|---|---|---|---|
| 8,683,019 | B1* | 3/2014 | Breau | H04L 61/2575 709/220 |
| 8,799,514 | B1* | 8/2014 | Vautrin | G06F 9/5011 370/392 |
| 2004/0037268 | A1 | 2/2004 | Read | |
| 2004/0165602 | A1* | 8/2004 | Park | H04L 12/66 370/401 |
| 2005/0198310 | A1 | 9/2005 | Kim | |
| 2006/0182100 | A1 | 8/2006 | Li | |
| 2008/0120402 | A1 | 5/2008 | Brown | |
| 2010/0146611 | A1 | 6/2010 | Kuzin et al. | |

(Continued)

OTHER PUBLICATIONS

M. Ford et al., Issues with IP Address Sharing, Jun. 2011, Internet Engineering Task Force (IETF), tools.ietf.org/html/rfc6269.*

(Continued)

*Primary Examiner* — Ruolei Zong
(74) *Attorney, Agent, or Firm* — Great Lakes Intellectual Property, PLLC (57) ABSTRACT

Network address translating is contemplated to be of a type where a network address translator (NAT), a carrier grade NAT (CGN), or other type of translator may facilitate reconstruction of translated addresses in a manner that ameliorates the amount of data that must be stored to facilitate the reconstruction.

17 Claims, 2 Drawing Sheets

(56) References Cited

U.S. PATENT DOCUMENTS

| | | |
|---|---|---|
| 2011/0162062 A1 | 6/2011 | Kumar |
| 2012/0011589 A1 | 1/2012 | Chen |
| 2012/0297089 A1* | 11/2012 | Carothers ........... H04L 61/2517 709/245 |

OTHER PUBLICATIONS

J. Reynolds et al., "Assigned Numbers," 1992, Internet Engineering Task Force (IETF), tools.ietf.org/html/rfc1340.*

T. Tsou et al., "Port Management to Reduce Logging in Large-Scale NATs; draft-tsou-behave-natx4-log-reduction-02," 2010, Internet Engineering Task Force, IETF, datatracker.ietf.org/doc/draft-tsou-behave-natx4-log-reduction/02/.*

International Search Report and Written Opinion for corresponding PCT Application No. PCT/US12/54752, dated Nov. 29, 2012, 8 pages.

Extended European Search Report of corresponding EP application No. 12831323.6-150512756411 (PCT/US2012054752), dated Apr. 21, 2015 by European Patent Office.

Network working group, Internet Draft, Category: Standards Track, by D. Cheng, Huawei Technologies, published Mar. 11, 2011; entitled NAT44 with Pre-allocated Ports (draft-cheng-behave-nat44-pre-allocated-ports-02).

Network Working Group; Internet-Draft; Intended status: Experimental Expires: Mar. 29, 2012; by C. Donley, C. Grundemann, V. Sarawat, K. Sundaresan; CableLabs; published Sep. 26, 2011; entitled Deterministic Address Mapping to Reduce Logging in Carrier Grade NATs (draft-donley-behave-deterministic-cgn-00).

Internet Engineering Task Force S. Perreault, Ed.; Internet-Draft Viagenie; Intended status: BCP; Expires: Feb. 19, 2012; by I. Yamagata, S. Miyakawa of NTT Communications, A. Nakagawa of Japan Internet Exchange (JPIX), H. Ashida IS Consulting G.K.; published Aug. 18, 2011; entitled Common requirements for Carrier Grade NAT (CGN) (draft-ietf-behave-lsn-requirements-03).

Behavior Engineering for Hindrance Avoidance; Internet-Draft; Intended status: Informational; Expires: Apr. 3, 2011; by T. Tsou, Ed. of Huawei Technologies, W. Li, Ed. of China Telecom, T. Taylor of Huawei Technologies; published Sep. 30, 2010; entitled Port Management to Reduce Logging in Large-Scale NATs (draft-tsou-behave-natx4-log-reduction-02).

Internet Engineering Task Force; Internet-Draft; by I. Yamagata, S. Miyakawa of NTT Communications, A. Nakagawa of Japan Internet Exchange (JPIX), H. Ashida of iTSCOM; Intended status: BCP; Expires: Jan. 13, 2011; published Jul. 12, 2010; entitled Common requirements for IP address sharing schemes (draft-nishitani-cgn-05).

Tsou T et al: "Port Management to Reduce Logging in Large-Scale NATs; draft-tsou-behave-natx4-log-reduction-02. txt", Port Management to Reduce Logging in Large-Scale NATS; draft-tsou-behave-natx4-log-reduction-02.txt, Internet Engineering Task Force, IETF; Pub Dt: Sep. 2010.

Cheng Huawei Technologies D: "NAT44 with Pre-allocated Ports; draft-cheng-behave-nat44-pre-allocated-ports-02. txt", NAT44 With Pre-Allocated Ports; draft-cheng-behavenat44-pre-allocated-ports-02.txt, Internet Engineering Task Force, IETF; Standardworkingdraft, Internet, Pub Dt: Mar. 2011.

Yamagata S Miyakawa NTT Communications A Nakagawa Japan Internet Exchange (JPIX) H Ashida Itscom I: "Common Requirements for IP address sharing schemes; draft-nishitani-cgn-05.txt", Common Requirements for IP Address Sharing Shemes; draft-nishitani-cgn-05.txt, Internet Engineering Task, Pub Dt: Jul. 2010.

Perreault Set al: "Common requirements for Carner Grade NAT (CGN); draft-ietf-behave-lsn-requirements-03.txt", Common Requirements for Carrier Grade NAT (CGN); draft-ietf-behave-lsn-Requirements-03.txt, Internet Engineering Task Force, IETF; Standardworkingdraft, Pub Dt: Aug. 2011.

Extended European search report is enclosed of corresponding EP patent application EP 12 83 1323, Pub Dt: Apr. 2015.

* cited by examiner

DETERMINISTIC MAPPING

CROSS-REFERENCE TO RELATED APPLICATIONS

This application is a continuation of U.S. application Ser. No. 13/232,509, filed Sep. 14, 2011, now U.S. Pat. No. 9,306,903, which in turn claims the benefit of U.S. provisional Application No. 61/534,199, filed Sep. 13, 2011, the disclosures and benefits of which are incorporated in their entireties by reference herein.

TECHNICAL FIELD

The present invention relates to methods, systems, and devices for facilitating network address mapping.

BACKGROUND

The world is rapidly running out of unallocated IPv4 addresses. To meet the growing demand for Internet service from new subscribers, devices, and service types, Internet Service Providers (ISPs) will be forced to share a single public IPv4 address among multiple subscribers using a technology such as but not limited to Carrier Grade Network Address Translator (CGN).

However, address sharing poses additional challenges to ISPs in responding to law enforcement requests or attack/abuse reports where identification of a server associated with a particular network address is desired. In order to respond to such requests an ISP will need to map a subscriber's inside IP address and port address with an outside IP address and an outside port address provided by the CGN for every connection initiated by a user.

The CGN may be configured to permanently or non-transitorily store connection logs sufficient to identify attackers and respond to abuse/law enforcement requests, but these logs imposes significant operational challenges to ISPs. In lab testing, the inventors of the present invention have observed CGN log messages to be approximately 150 bytes long for NAT444, and 175 bytes for DS-Lite (individual log messages vary somewhat in size). Reports from several ISPs indicate the average number of connections per household per day at approximately 33,000 connections per day. When each connection is individually logged by the CGN, a data volume of approximately 5 MB per subscriber per day, or about 150 MB per subscriber per month, is required to maintain the log. Based on available data, a 1-million subscriber service provider will generate approximately 150 terabytes of log data per month, or 1.8 petabytes per year.

Accordingly, the inventors of the present invention believe a need exists to ameliorate the amount of data a CGN, or other device in communication therewith, would need to store in order to identify attackers and/or respond to abuse/law enforcement requests.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
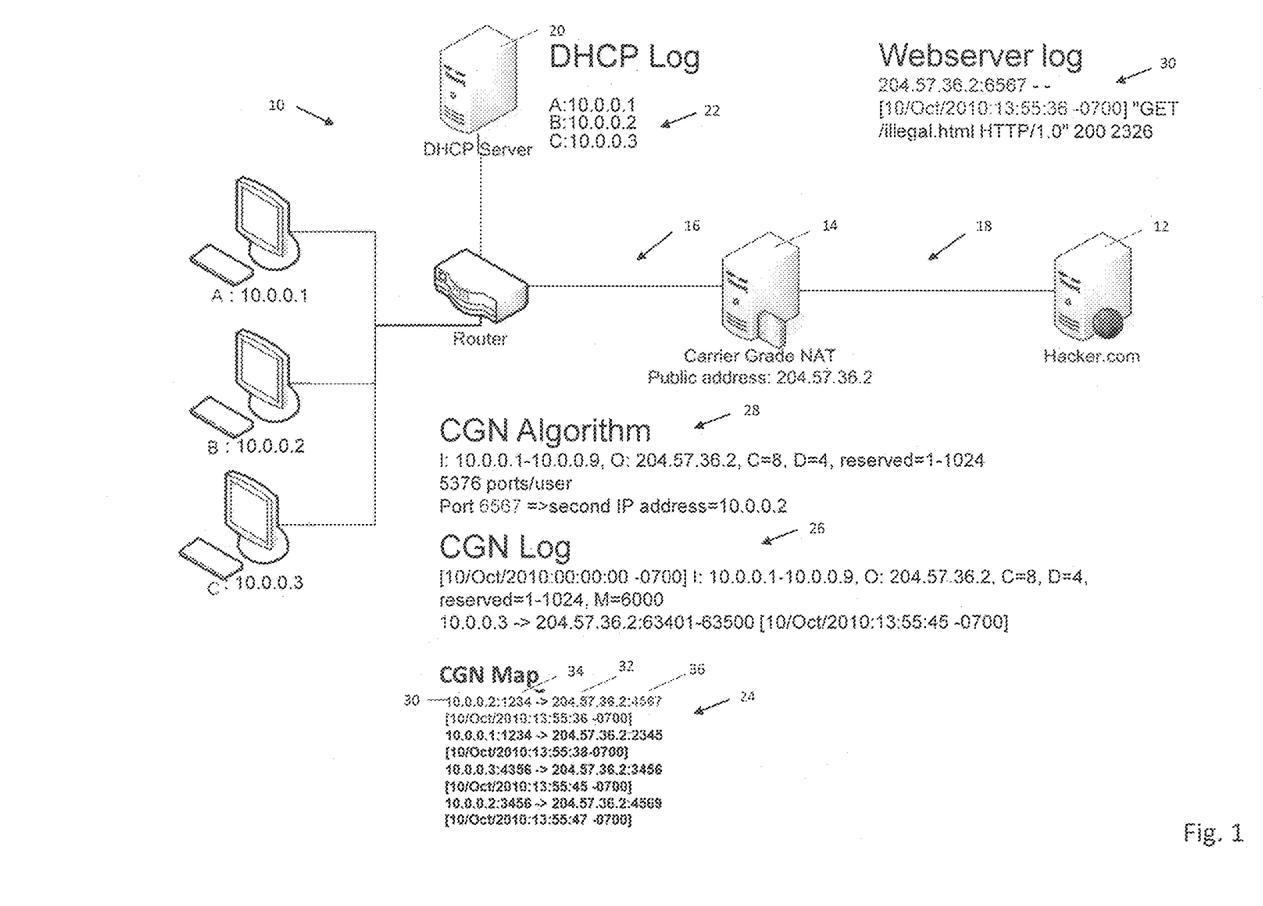
FIG. 1 illustrates a network translating system as contemplated by one non-limiting aspect of the present invention.

FIG. 1 illustrates a network translating system 10 as contemplated by one non-limiting aspect of the present invention. The system 10 is described with respect to supporting Internet Protocol (IP) based connections between a plurality of devices A, B, C and a server 12 or other entity where a Carrier Grade Network Address Translator (CGN) 14 facilitates mapping network addressing. The CGN 14 is described for exemplary non-limiting purposes as one type of Network Address Translator (NAT) operable to facilitate multiplexing a larger pool of network addresses across a smaller pool of network addresses. The CGN 14 is just but one type of device that is particularly susceptible to the data volume problems noted above. The present invention, however, fully contemplates its use and application with any system and is not particular limited to a CGN-based system.

The CGN 14 defines a boundary between an inside network 16 and an outside network 18. The inside network 16 may correspond with a particular geographical location or other area within which a pool of network addresses are shared. The outside network 18 may correspond with the Internet or some other network unbound to the inside network 16 and/or otherwise bound to a pool of network addresses smaller than the pool available to the inside network 16. The CGN 14 may be configured, for example, to facilitate sharing 50,000 inside network addresses amongst the inside network 16 with 5,000 outside network addresses amongst the outside network 18. The CGN 14 may be configured in this manner to map the inside network addresses to suitable outside network addresses in a manner that ameliorates the number of network addresses consumed by the CGN 14, i.e., by allowing the smaller number of outside network addresses to be used with a larger number of inside network addresses.

The inside and outside network addresses may be comprised of an IP address and a port address. The IP addresses may be an IPv4 and/or an IPv6 address. The port addresses may correspond with the 65,536 ports defined within the corresponding Transmission Control Protocol (TCP) or User Datagram Protocol (UDP) specifications. A Dynamic Host Configuration Protocol (DHCP) or other suitable server 20 may be included to uniquely assign an inside IP address from the available pool of inside IP addresses to the plurality of devices A, B, C and/or each subscriber (in some cases one per household, however, some subscribers may pay for more). The DHCP server 20 may keep a table or other storage memory 22 for matching the assigned IP addresses to an identity of each device, e.g., device A, device B, and device C. The DHCP server 20 and/or the devices A, B, C may be configured to assign the inside port address used for each connection. In this manner, when one of the devices A, B, C desires to communicate with the remote device 12, the DHCP server 20 may cooperate with the device A, B, C to facilitate defining the corresponding IP address to be one of the available inside IP addresses.

The devices A, B, C may be any device capable of supporting IP-based communications and/or connections. The devices A, B, C, for example, may be any type of terminal sufficient for rendering electronic content, such as but not limited to a set-top box (STB), a television, a computer (desktop, laptop, tablet, PDA, etc.), a mobile phone, a media terminal adapter (MTA), a digital video recorder (DVR), etc. The devices A, B, C may include a display or other output through which with the content may be rendered. The devices A, B, C may include a user interface or other feature to facilitate interacting with a user thereof, such as to facilitate selection and use of the content. The devices A, B, C may include a memory, a processor, and other elements necessary to facilitate communications and other operations associated with the present invention. Optionally, a router or other device may be included to facilitate indications between the devices and the CGN.

The inside and/or outside networks 16, 18 may be any type of electronic medium through which signals may be exchanged between one or more of the devices A, B, C and/or remote device 12. The networks 16, 18 may be any type of wireline or wireless network, or combination thereof, such as but not limited to a cable television network, a cellular network, a Wi-Fi network, an optical network, etc. The content and/or other types of data carried over the networks 16, 18 may be any type of electronic content suitable for electronic transmission, such as but not limited to video, audio, or some combination thereof. The remote device 12 may be a website or a content source associated with a service provider, for example, a cable television service provider, a broadcast television service provider, a satellite television service provider, a multiple system operator (MSO), a streaming video/audio server/service, a home media gateway, or any other entity operable to facilitate transmission of selectable versions of available content.

The CGN 14 may be configured to map the network addresses (i.e., the IP addresses and the port addresses) dynamically on per connection basis. However, research shows that subscribers may overage 33,000 connections per day with some users using up to 216,000 connections per day. Keeping track of each translation add/done for each connection may complexity and require significant storage (approximately 150 MB/month/subscriber), which can be problematic since it may be desirable to store 12 months of such logging to facilitate law enforcement requests in order to identify subscribers based on their network addresses. As an alternative to logging each connection, one non-limiting aspect of the present invention contemplates an algorithm to deterministically map the inside addresses used on the inside of the CGN 14 to outside addresses on the outside of the CGN 14.

The algorithm may allow an operator charged with servicing the law enforcement request to provide or identify the inside IP address, and hence the subscriber identity, from the outside IP address and port so that the operator can easily run the algorithm and identify the customer without having to look in the CGN logs. This may prevent the operator from having to log huge amounts of session data from the CGN 14 and then process it to fulfill the law enforcement requirements. As part of this algorithm, the operator may assign each CGN 14 (multiple CGNs may be simultaneously supported) an IP address range for the inside of the CGN 14, another IP address range for the outside of the CGN 14, and a compression ratio. The IP address range assigned to the outside of the CGN 14 may be smaller than the inside since the whole purpose of the CGN 14 is IP address multiplexing. The compression ratio will be greater than or equal to the inside ratio divided by the outside ratio.

While a subscriber may use thousands of connections per day, most subscribers use far fewer at any given time. When the compression ratio is low (e.g., the ratio of the number of subscribers to the number of outside addresses allocated to a CGN 14 may be closer to 8:1 or 10:1 than 1000:1), each subscriber could expect to have access to thousands of TCP/UDP ports at any given time. Thus, as an alternative to logging each connection, CGNs 14 could deterministically map customer private addresses on the inside of the CGN 14 to public addresses on the outside of the CGN 14. This algorithm will allow an operator to identify a subscriber internal IP address when provided the public side IP and port number without having to examine a CGN map 24, i.e., the detailed lists of mapped-to addresses made by the CGN 14 while connections are active. This prevents a CGN 14 from having to support massive amounts of session data from the CGN and then process it to identify a subscriber.

One non-limiting aspect of the present invention contemplates the CGN algorithm relying on the following variables:
  Inside IPv4/IPv6 address range (I);
  Outside IPv4 /IPv6 address range (O);
  Compression ratio (e.g. inside IP addresses/outside IP addresses) (C);
  Dynamic address pool factor (D), to be added to the compression ratio in order to create an overflow address pool;
  Maximum ports per user (M); and
  Reserved TCP/UDP port list.

The CGN algorithm can then be used to reserve outside ports as follows:

1. The CGN 14 removes reserved ports from the port candidate list (e.g. 1-1024). At a minimum, the CGN 14 may be required to remove system ports from the port candidate list reserved for deterministic assignment.

2. The CGN 14 calculates the total compression ratio (C+D), and allocates 1/(C+D) of the available ports to each internal IP address. Any remaining ports are allocated to a dynamic pool available as additional parts to fulfill overflow concerns. Port allocation could be made sequentially (e.g. the first block goes to address 1, the second block to address 2, etc.), staggered (e.g. address 1 receives ports n*(C+D), address 2 receives ports 1+n*(C+D), etc.), or through some other deterministic algorithm left to CGN implementation. Subscribers could be restricted to ports from a single IP address, or could be allocated ports across all addresses in a pool, for example.

3. When a subscriber initiates a connection, the CGN 14 creates a translation mapping between the subscriber's inside local IP address/port and the CGN outside global IP address/port. The CGN 14 may be required to use one of the ports allocated in step 2 for the translation as long as such ports are available. The CGN 14 may be required to use the pre-allocated port range from step 2 for port control protocol (PCP) reservations as long as such ports are available. While the CGN 14 maintains its mapping table 24, it need not generate a log entry or other non-transitory data storage, e.g., permanent storage of the map 24, for translation mappings created in this step.

4. The CGN 14 may have a pool of ports left for dynamic assignment. If a subscriber uses more than the range of ports allocated in step 2 (but fewer than the configured maximum ports), the CGN 14 may then use a port from the dynamic assignment range for such a connection or for PCP reservations. The CGN 14 may be required to log dynamically assigned ports or block of ports to facilitate subscriber-to-address mapping. The CGN 14 may be required to manage ports dynamically assigned from the dynamic assignment range, such as by non-transitorily storing data sufficient for logging the inside IP address associated there\with.

5. Configuration of reserved ports (e.g. system ports) is left to operator configuration. Thus, the CGN 14 may be configured to transitorily maintain translation mapping information for all connections within its internal translation tables; however, it only needs to externally, i.e., non-transitorily, log translations for dynamically-assigned ports.

In this manner, when an operator configures an inside address range of 192.168.0.0/28 (14 usable addresses) and outside address of 203.0.113.1, a dynamic buffer factor is set to '2', the total compression ratio is 1:(14+2)=1:16. Only the system ports (e.g. ports <1024) are reserved. This configuration causes the CGN 14 to pre-allocate 4032 TCP and 4032 UDP ports per inside IP address. In the event that they are allocated sequentially, where 192.168.0.1 maps to 203.0.113.1 ports 1024-5055, 192.168.0.2 maps to 203.0.113.1 ports 5056-9087, etc., the dynamic port range thus contains ports 57472-65535. Finally, the maximum ports/subscriber is set to 5040.

When subscriber 1 using 192.168.0.1 initiates a low volume of connections (e.g. <4032 concurrent connections), the CGN 14 maps the outgoing source address/port to the pre-allocated range. These translation mappings are not logged. Subscriber 2 concurrently uses more than the allocated 4032 ports (e.g. for peer-to-peer, mapping, video streaming, or other connection-intensive traffic types), the CGN 14 allocates up to an additional 1008 ports using bulk port reservations. In this example, subscriber 2 uses outside ports 5056-9087, and then 100-port blocks between 58000-58999. Connections using ports 5056-9087 are not logged, while 10 log entries are created for ports 58000-58099, 58100-58199, 58200-58299, . . . , 58900-58999.

If a law enforcement agency reports abuse from 203.0.113.1, port 2001, the operator can reverse the mapping algorithm to determine that subscriber 1 generated the traffic without consulting logs. If a second abuse report comes in for 203.0.113.1, port 58204, the operator will determine that port 58204 is within the dynamic pool range, consult the log file, and determine that subscriber 2 generated the traffic (assuming that the law enforcement timestamp matches the operator timestamp).

In order to be able to identify a subscriber based on observed external IP address, port, and timestamp, an operator needs to know how the CGN 14 was configured with regards to internal and external IP addresses, dynamic address pool factor, maximum ports per user, and reserved port range at any given time. Therefore, the CGN 14 may be required to generate a log message any time such variables are changed. Also, the CGN 14 may be required to generate such a log message 26 once per day to facilitate quick identification of the relevant configuration in the event of an abuse notification. Such a log message may be required to, at minimum, include the timestamp, inside prefix I, inside mask, outside prefix O, outside mask, D, M, and reserved port range; for example: [Wed Oct. 11 14:32:52 2000]: 192.168.0.0:28:203.0.113.0:32:2:5040:1-1023,5004,5060.

Figure 2:
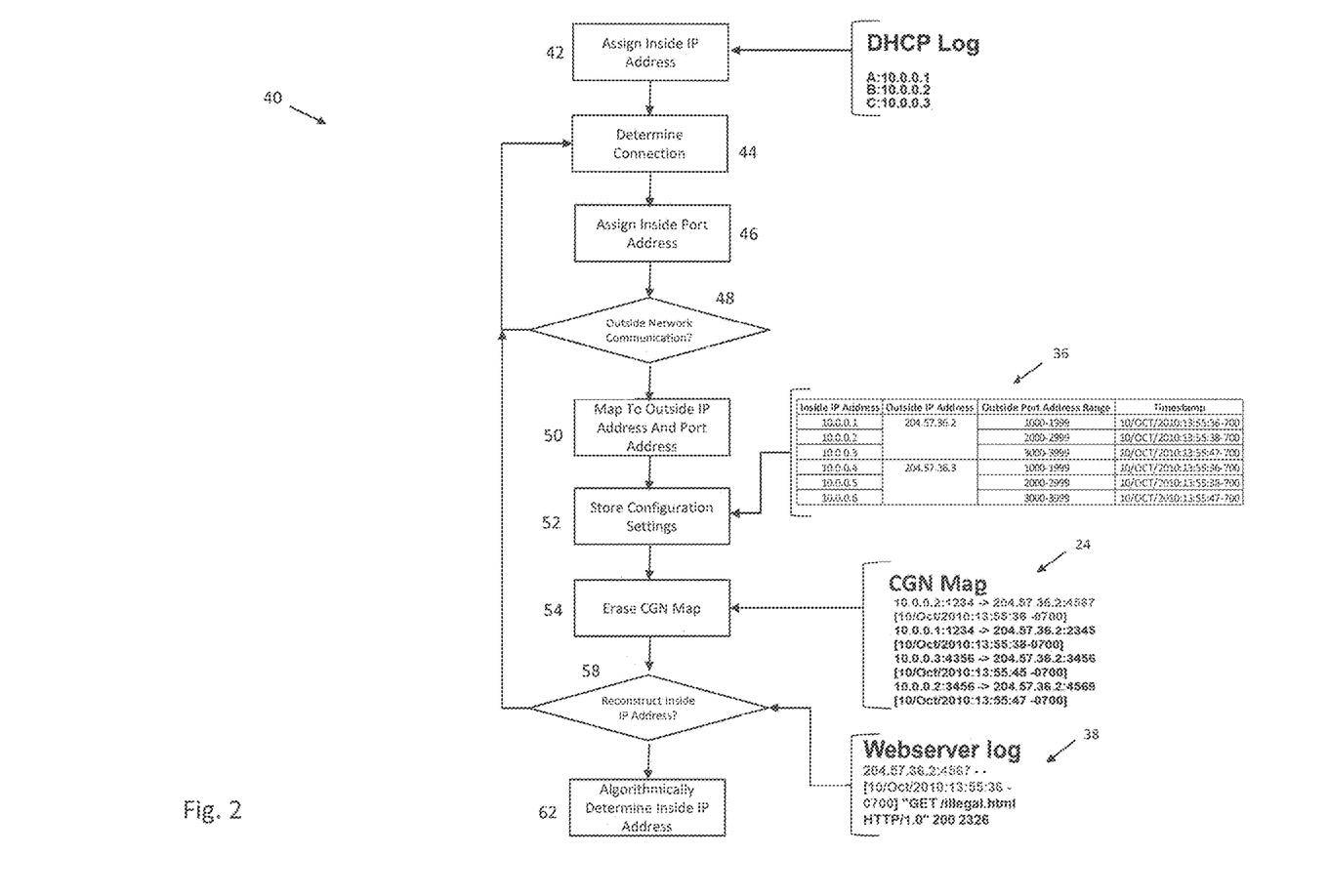
FIG. 2 illustrates a flowchart of a method for translating network addresses as contemplated by one non-limiting aspect of the present invention.

FIG. 2 illustrates a flowchart 40 of a method for translating network addresses as contemplated by one non-limiting aspect of the present invention. The method may be embodied in a computer readable medium having stored thereon a plurality of instructions including instructions which, when executed by a processor or other feature or device of one or more of the elements described above, cause the processor to facilitate deterministic mapping of network messages in a manner that ameliorates the amount of data required to identify devices from the outside addresses. The method is described for exemplary non-limiting purposes with respect to one or more of the devices establishing connections with a website hosted on the remote device, and thereafter, identifying one or more of the devices based on an outside network address stored within web service log maintain by the remote device.

The method is described with respect to translating network addresses of the type having an IP address and a port address, where the IP address may be IPv4 or IPv6 address. This is done for exemplary non-limiting purposes as the present invention fully contemplates facilitating mapping of other types of network addresses and is not necessarily limited to mapping network addresses have an IP address and/or a port address and/or VLANs or MPLS labels.

Block 42 relates to assigning an inside IP address to the devices. The inside IP address may be assigned by the DHCP server 20 or other entity associated with distributing IP addresses for devices intending to communicate or otherwise establish connections over the inside network. The inside IP address may be statically or dynamically assigned from a larger pool of addresses than which may be available outside of the CGN 14 (i.e., the inside addresses may be private to the inside network 16 whereas the less number of outside addresses are globally-available). The dynamic assignment may be characterized by the available IP addresses being distributed on an as-needed basis to requesting devices without a prior dedication or pre-assignment of the inside IP address to the particular devices A, B, C. The dynamic assignment may result in the same outside IP addressed being simultaneously assigned to different devices A, B, C, using port information to differentiate the traffic for each device. (Inside addresses may be handed out to subscribers via DHCP where the corresponding lease may typically last a month, or statically assigned. When ISPs deploy CGNs, these inside addresses may only be unique within a limited region. Globally-unique outside addresses will be shared simultaneously among several subscribers (inside addresses) by borrowing bits from the port field.

Block 44 relates to determining one of the devices A, B, C desiring to establish a connection to facilitate communications over the inside network 16. For exemplary purposes, the method is predominately described with respect to operations associated with facilitating translations relative to a single device; however, similar processes may be used to facilitate network address translating for any number of devices. The connection may relate to one or more connections needed by the device A to communicate with a website hosted on a remote device or other device. Due to the increasing number of connections, the device A may need upwards of 33,000 connections per day and thereby, upwards of 33,000 translation mappings per day. As contemplated by one non-limiting aspect of the present invention, connections may be uniquely identified by a five-tuple of source IP, destination IP, source port, destination port, and protocol (e.g. TCP/UDP).

Block 46 relates to assigning an inside port address to the determined connection(s). The inside port address may be selected from one of the 65,536 available ports defined by TCP and UDP. The inside port address will be automatically selected by the TCP/IP stack built-in to the device initiating communication. For connections initiated by the device, the inside port addresses may be assigned dynamically such that the inside port addresses are not pre-assigned (of course, some ports may be pre-assigned and/or static if the devices is acting as a server or other device requiring or desiring dedicated ports).

Block 48 relates to determining whether the connection associated with the assigned inside IP address and inside port address, i.e., the inside address, to be part of the connection intended is to extend outside of the CGN 14 to the website of the remote device. In the event the connection is to the outside network 18, Block 50 relates to mapping the inside IP address and inside port address to a corresponding outside IP address and outside port address pursuant to a compression ratio in use by the CGN 14 at that time. The CGN 14 may be configured to facilitate use of a greater number of addresses over the inside network 16 than the outside network 16, i.e., the CGN 14 may be configured to manage private addresses over the inside network 16 and to multiplex those private addresses to a lesser number of public addresses for use over the outside network 18. The settings and other parameters of the CGN 24 at the time of a mapping may be used to define the configuration settings of the CGN 14.

Optionally, in the event the device A requires more connections than that which is assigned as part of the CGN algorithm, additional ports may be allocated on a bulk and/or dynamic basis. These additional ports, as noted above, may be may be set aside from the number ports pre-allocated within the outside port ranges to the individual inside IP addresses. In the event one of the devices requires additional ports, the CGN 14 may provide the additional ports from those set aside to support the bulk and/or dynamic port assignments. Rather than individually storing the CGN map for additionally assigned ports, the additional ports may be assigned in blocks of 100 or other block groupings such that a similar method of grouping the available outside port addresses according to port ranges may be used to identify the corresponding inside IP address without having to individually map the inset IP address to each one of the additional outside port addresses.

Block 52 relates to storing the configuration settings of the CGN 14. The configuration settings may be stored periodically over time and/or upon changes to the CGN 14. The configuration settings may be used to dictate the mapping of the inside IP addresses and the inside port addresses to outside IP addresses and outside port addresses sufficient to facilitate the connections pursuant to the compression rules of the CGN 14. The CGN mapping may be performed in accordance with the CGN algorithm 28 shown in FIG. 1 where multiple inside IP addresses, e.g., the inside IP address is further illustrated devices, are mapped to the same outside IP address with the corresponding inside port addresses being mapped to different outside port addresses. The outside port addresses may be pre-assigned or dedicated to particular ones of the inside IP addresses in order to provide a deterministic or fixed selection of the outside port addresses based on the inside IP addresses.

Keeping with FIG. 1, the CGN algorithm may be used to generate the CGN map 24. The CGN map illustrates the various inside IP addresses 30 of the devices being mapped to the same outside IP address 32 and the various inside port addresses 34 being mapped to different outside port addresses 36. The inside IP addresses 30 are shown to be mapped to the same outside IP addresses 32 in order to demonstrate one function of the CGN 14 where the CGN 14 is configured to allow multiple devices to use the same outside IP address 32. Optionally, the CGN 14 may be configured to map the inside IP addresses 30 to different outside IP addresses 32 and/or to support multiple groupings of the devices A, B, C being mapped to different ones of the available outside IP addresses 32 (only one outside IP address 32 is shown but others are contemplated to be used in conjunction therewith). The inside port addresses 34 are shown to be mapped to different ranges of the available outside port addresses according to the stratification specified by the CGN algorithm (see CGN log table 36 shown in FIG. 2). Because the outside port addresses are mapped to pre-determined ones of the inside IP addresses, the CGN algorithm may be used to identify the corresponding inside IP address based on the outside port address without having to permanently store the entire CGN map 24.

Instead of storing the entire CGN map, the CGN may be configured to store the CGN log 26 in algorithm or table form 36. The CGN log 26 may be stored in place of the CGN configuration or other data in order to facilitate identifying the operating parameters of the CGN 14 for particular period of time. The CGN log 26 may include a timestamp and the configuration settings use by the CGN algorithm during a period of time corresponding with the timestamp in order to facilitate mapping the inside IP addresses and the inside port addresses to the outside IP addresses and the outside port addresses. In this manner, the CGN log 26 may be consulted at any time after a device connects over the outside network to identify that device, such as to facilitate identifying inside IP addresses from a webserver log included as part of an identification requests from law enforcement.

Returning to FIG. 2, Block 54 relates to erasing the CGN map 24. The CGN map 24 may be erased in order to reduce the amount of data that must be stored at CGN 14 or on a device associated therewith. The CGN 14 may transitorily store the map 24 for a short period of time, such as while the connection is still active, in order to keep track of the current connections and/or to ensure the same outside addresses are not simultaneously used for multiple connections. This information, however, may be erased as each connection is disconnected and without the corresponding data being stored at CGN 14 or otherwise transferred from the CGN 14. The erasure of the CGN map 24 may be helpful in ameliorating the storage requirements and/or data transmission requirements on the CGN 14, which given the possibility that the CGN 14 may be used to support relatively large number of connections, can provide a significant improvement over CGNs that are required to store the CGN map 24 and/or otherwise store or process more data than that required by the CGN log 26 and/or table 36 proposed by the present invention.

Blocks 58, 62 relate to determining a need to reconstruct or otherwise identify one of the inside IP addresses based on an outside address provided from the remote device or other device outside of the CGN 14. One non-limiting aspect of the present invention contemplates reconstructing the inside IP address from a webserver log 38 identifying the outside IP address, the outside port address, and the timestamp for the connection for which the inside IP address is desired. The CGN algorithm 28 may be used to reconstruct the inside IP address. The CGN algorithm 28 may process the outside IP address and timestamp to initially identify a range of inside IP addresses associated with the corresponding outside IP address. Thereafter, the stratification provided by the outside port address may be used to identify one of the inside IP addresses within the identified range to be the IP address corresponding with the webserver log information.

In order to further facilitate limiting the data storage and/or processing demands on the CGN 14, the DHCP server 20 may be relied upon to actually identify the device associated with the reconstructed inside IP address. This use of the DHCP server 20 may also be beneficial in coping with the devices assigned to particular ones of the available inside IP addresses being changed over time such that the changes can occur in a manner that is transparent to the CGN 14 and without adding additional burdens to the operation of the CGN 14. As an alternative to a per-connection logging method of reconstructing the inside IP address, this method deterministically maps inside addresses to outside addresses in such a way as to be able to algorithmically calculate the mapping without relying on per-connection logging.

One non-limiting aspect of the present invention contemplates geographically grouping the inside IP addresses associated with each of the available outside IP addresses. This may include a geo-location method to identify a user's geographic location based on the user's IP address. The sources of geo-location information may be Regional Internet Registries (RIRs), comparing the user's public IP address with known locations of other neighboring servers and routers, data mining user-submitted geographic location data, examining information contributed by Internet Service Providers, merging databases from different suppliers, Reverse DNS lookups etc. The accuracy of the location information may have many uses including: regional licensing used by Internet movie vendors and online broadcasters, targeting local content (location-based marketing), preventing online fraud etc. This may also improve the ability of law enforcement to identify users behind a CGN (e.g. pursuant to HR 1981, where ISPs are obligated to retain logs of DHCP address assignments, but not CGN logs)—location significance offers an additional tool in the investigation of computer crimes, even without the ability to specifically identify the user.

Optionally, the inside addresses may be private addresses and that they have no geo-location information associated with them. By assigning private address space in location-aware blocks to specific head-ends, routers, or other intermediary devices and pairing each discrete location with its own location-aware public address pool, operators may be able to retain geographical significance of the CGN addresses and allow geo-location to work as well (or nearly as well) as it does today. One potential downside of segregating the public addresses into distinct pools is that an operator may lose some statistical multiplexing ability. That is, an operator may run the risk of one pool being used up while other addresses are still available. There are at least two potential solutions to this concern: 1) "Fuzzy" boundaries—allow an exhausted pool to "borrow" addresses from other neighboring pools (and log accordingly); and 2) Abstracted pools—create less-localized pools as reserves that can be borrowed from when a more localized pool is exhausted.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having non-transitory instructions stored thereon which when executed with a processor are sufficient for controlling a network address translator (NAT) to facilitate translating communications requiring inside Internet Protocol (IP) addresses over an inside network and outside IP addresses over an outside network, the non-transitory computer-readable medium including non-transitory instructions sufficient for:
   dividing a plurality of outside port addresses available for use by the NAT into at least a plurality of first outside port ranges;
   associating at least one of the first outside port ranges with each one of a plurality of the inside IP addresses such that each of the plurality of inside IP address is associated with a different one or more of the first outside port ranges;
   translating communications between the inside network and the outside network such that the inside IP addresses associated therewith are translated to include the same outside IP address plus a different one of the outside port addresses within the at least one of the first outside port ranges associated therewith;
   dividing the plurality of outside port addresses into at least one or more second outside port ranges such that each of the outside port addresses in each of the first outside port ranges is different than each of the outside port address in each of the second outside port ranges; and
   reserving the second outside port ranges for overflow translation of the communications such that the outside port addresses within the second outside port ranges are unused for translation of the communications until outside port address demand exceeds port address capabilities of at least one of the first outside port ranges.

2. The computer-readable medium of claim 1 further comprising non-transitory instructions sufficient for:
   determining the plurality of outside port addresses available for use by the NAT from a greater plurality of outside port addresses, the greater plurality of outside port addresses additionally including a plurality of reserved port addresses omitted from the plurality of outside port addresses;
   identifying a first inside IP address of the plurality of inside IP addresses associated with a first translation of the communications as a function of a first outside port address associated therewith, the first IP address being a one of the plurality of inside IP addresses previously associated with the one of the first outside port ranges including the first outside port address.

3. The non-transitory computer-readable medium of claim 1 further comprising non-transitory instructions sufficient for associating the first outside port ranges with the inside IP addresses using a one-to-many table, the one-to-many table including a single cell for each of the first outside port ranges being cross-referenced to a single cell of one of the inside IP addresses, thereby resulting in many of the first outside port ranges being related to one of the inside IP addresses by way of the cell identifying the corresponding outside port address, each cell for the first outside port ranges demarcating the outside port addresses therein using a upper limit and a lower limit value and without reciting intermediary values.

4. The non-transitory computer-readable medium of claim 3 further comprising non-transitory instructions sufficient for reconstructing a first translation of the translated upstream communications occurring during a period of time by using the one-to-many table to identify a first inside IP address of the plurality of inside IP addresses as a function of a first outside port address of the plurality of outside port addresses associated therewith, the first IP address being the one of the plurality of inside IP address previously associated with the one of the first outside port ranges including the first outside port address.

5. The non-transitory computer-readable medium of claim 4 further comprising non-transitory instructions sufficient for reconstructing the first translation after deleting a mapping table used during the period of time, the mapping table individually recording each of the translated upstream communications occurring during the period of time using a one-to-one relationship whereby each inside IP and port address is cross-referenced with one of the outside IP and port addresses.

6. The non-transitory computer-readable medium of claim 1 further comprising non-transitory instructions sufficient for determining the first outside port ranges as a function of a compression formula, the compression formula specifying a number of the outside port addresses allocated to each of the first outside port ranges according to the following:

$$(M-A)*(1/(C+D)),$$

wherein M=maximum number of outside port addresses, C=(number of inside IP addresses)/(number of outside IP addresses), D=dynamic address pool factor and A=number of reserved outside port address.

7. The non-transitory computer-readable medium of claim 1 further comprising non-transitory instructions sufficient for
specifying a number of the outside port addresses allocated to each of the second outside port ranges according to the following:
i.$((M-A)-(M-A)*(1/(C+D)))/N$ wherein M=maximum number of outside port addresses, C=(number of inside IP addresses)/(number of outside IP addresses), D=dynamic address pool factor, A=number of reserved outside port address and N=number of second outside port ranges.

8. The non-transitory computer-readable medium of claim 1 further comprising non-transitory instructions sufficient for determining the plurality of outside port addresses without correspondingly processing the plurality of the inside IP addresses such that the plurality of outside port addresses are determined independently of the plurality of the inside IP addresses.

9. The non-transitory computer-readable medium of claim 1 further comprising non-transitory instructions sufficient for determining the plurality of outside port addresses from a predefined list of outside port addresses generated prior to determining the plurality of the inside IP addresses.

10. A non-transitory computer-readable medium having non-transitory instructions stored thereon which when executed with a processor are sufficient for controlling a network address translator (NAT) to facilitate translating communications requiring inside Internet Protocol (IP) addresses over an inside network and outside IP addresses over an outside network, the non-transitory computer-readable medium including non-transitory instructions sufficient for:
dividing a plurality of outside port addresses available for use by the NAT into at least a plurality of first outside port ranges;
associating at least one of the first outside port ranges with each one of a plurality of the inside IP addresses such that each of the plurality of inside IP address is associated with a different one or more of the first outside port ranges;
translating communications between the inside network and the outside network such that the inside IP addresses associated therewith are translated to include the same outside IP address plus a different one of the outside port addresses within the at least one of the first outside port ranges associated therewith;
translating communications to include the same outside IP address and a different one of the plurality of outside port addresses, including selecting the different one of the plurality of outside port addresses from within the first outside port range of the inside IP address associated therewith; and
determining an overload for a first inside IP address of the plurality of inside IP addresses when the communications associated therewith requires active use of a quantity of outside port addresses exceeding a quantity of outside port addresses available within the associated one or more of the first outside port ranges.

11. The non-transitory computer-readable medium of claim 10 further comprising non-transitory instructions sufficient for translating communications associated with the first inside IP address using the outside port addresses available within the associated one or more the first of a port ranges until the overload is determined.

12. non-transitory The non-transitory computer-readable medium of claim 11 further comprising non-transitory instructions sufficient for:
further dividing the outside port addresses into one or more second outside port ranges such that:
i. each of the second outside port ranges includes a plurality of the outside port addresses different than a plurality of the outside port address in each of the other second outside port ranges;
ii. each of the outside port addresses in each of the first outside port ranges is different than each of the outside port address in each of the second outside port ranges;
associating one of the second outside port ranges with the first inside IP address upon determining the overload; and
translating the communications associated with the first inside IP address occurring after the overload such that the first inside IP address is translated to include the same outside IP address and a different one of the outside port addresses within the one of the second outside port ranges associated therewith at least until the number of outside port addresses within the one of the second outside port range associated therewith is exceeded.

13. The non-transitory computer-readable medium of claim 12 further comprising non-transitory instructions sufficient for:
associating an additional one of the second outside port ranges not previously associated with one of the inside IP address with the first inside IP address when exceeding the number of outside port addresses available within the second outside port range associated therewith; and
translating the communications associated with the first inside IP address occurring thereafter to include the same outside IP address and a different one of the outside port addresses within the additional one of the second outside port range associated therewith at least until the number of outside port addresses within the additional one of the second outside port range associated therewith is exceeded.

14. A method for deterministically associating messages transmitted from a plurality of devices for translation with a network address translator (NAT) when each of the plurality of devices is associated with a different one of a plurality of inside addresses, the method comprising:
dividing a plurality of outside port addresses of the NAT into at least a plurality of first outside port ranges and one or more second outside port ranges such that:
  i. each of the first outside port ranges includes a plurality of the outside port addresses different than a plurality of the outside port addresses in each of the other first outside port ranges;
  ii. each of the second outside port ranges includes a plurality of the outside port addresses different than a plurality of the outside port addresses in each of the other second outside port ranges; and
  iii. each of the outside port addresses in each of the first outside port ranges is different than each of the outside port address in each of the second outside port ranges;
associating at least one of the first outside port ranges with each one of the devices such that each device is associated with a different one or more of the first outside port ranges;
determining at least a first device attempting to transmit one or more messages during an overload condition, the overload condition occurring when messaging of the corresponding device requires the NAT to utilize more of the outside port addresses than available within each of the first outside port ranges associated with the first device; and
associating one of the second outside port ranges with the first device, and not the remaining devices, for a period of time at least corresponding with the overload condition.

15. The method of claim 14 further comprising reconstructing a first translation of communications translated with the NAT during the overload condition to identify a first inside address of the plurality of inside addresses as a function of a first outside port address of the plurality of outside port addresses associated with the first translation, the first address being the inside address previously associated with the one of the second outside port ranges including the first outside port address.

16. The method of claim 14 further comprising reconstructing a first translation of communications translated with the NAT prior to determining the overload condition to identify a first inside address of the plurality of inside addresses as a function of a first outside port address of the plurality of outside port addresses associated with the first translation, the first address being the inside address previously associated with the one of the first outside port ranges including the first outside port address.

17. The method of claim 14 further comprising determining the overload condition when a quantity of active connections for the first device simultaneously requires use of a quantity of outside port addresses in excess of the at least one of the first outside port ranges associated therewith.

* * * * *